United States Patent [19]
Rees

[11] Patent Number: 5,935,296
[45] Date of Patent: Aug. 10, 1999

[54] BONDED MEDIUM

[76] Inventor: Geraint Rees, 54 Rehoboth Rd., Llanelli, Carmarthenshire SA15 5DJ, United Kingdom

[21] Appl. No.: 08/809,633

[22] PCT Filed: Sep. 19, 1995

[86] PCT No.: PCT/GB95/02223

§ 371 Date: Mar. 18, 1997

§ 102(e) Date: Mar. 18, 1997

[87] PCT Pub. No.: WO96/09416

PCT Pub. Date: Mar. 28, 1996

[51] Int. Cl.$^6$ .................................................... C22B 7/02
[52] U.S. Cl. ..................... 75/770; 75/746; 75/1; 75/3; 75/4; 75/5; 75/24; 75/25
[58] Field of Search ................... 75/770, 746, 1, 75/3, 4, 5, 24, 25

[56] References Cited

U.S. PATENT DOCUMENTS

| | | | |
|---|---|---|---|
| 3,895,088 | 7/1975 | Goksel | 264/82 |
| 4,239,550 | 12/1980 | Köhler | 106/314 |
| 4,623,682 | 11/1986 | Nicholson et al. | 524/3 |
| 4,704,230 | 11/1987 | Blakmore | 252/502 |
| 4,743,289 | 5/1988 | Mickus et al. | 71/61 |
| 4,954,134 | 9/1990 | Harrison et al. | 23/313 |
| 5,328,497 | 7/1994 | Hazlett | 71/28 |

FOREIGN PATENT DOCUMENTS

| | | |
|---|---|---|
| 1071902 | of 1992 | Canada . |
| 41 01 584 A1 | 7/1992 | Germany . |

OTHER PUBLICATIONS

Photocopy of PCT International Search Report dated Jan. 12, 1996.

*Primary Examiner*—Patrick Ryan
*Assistant Examiner*—M. Alexandra Elve
*Attorney, Agent, or Firm*—Klima & Pezzlo, P.C.

[57] ABSTRACT

Thermally shock stable bonded solid materials are formed by mixing a solid mineral or inorganic material in an aqueous medium with a lignosulfonate, treating the aqueous medium with a metal ion-based complexing agent (such as lime), with application of heat sufficient to maintain the lignosulfonate in fluid form, so as to produce an intimate mix of saturated slaked lime with lignosulfonate and the mineral or inorganic material, and thoroughly mixing the resulting substantially dry material with dry urea (or a derivative thereof) so as to cause the mix to agglomerate, preferably followed by shaping the agglomerates by briquetting or the like.

14 Claims, No Drawings

BONDED MEDIUM

BACKGROUND OF THE INVENTION

The present invention is concerned with bonded media. Certain inorganic materials are sometimes present in a form in which they are difficult to handle and use. For example, basic oxygen steelmaking sludge (which is a waste product from the basic oxygen steelmaking process), contains up to 30% moisture and solids, including ferrous sulfide, iron oxide and various foundry additives, as well as other metals such as zinc.

Basic oxygen steelmaking sludge is generally considered to be a waste product, for which disposal is very expensive and difficult, partly because of its zinc content. We have now devised a way of using such basic oxygen steelmaking sludge, and other mineral and inorganic materials.

According to the present invention therefore, there is provided a method of forming thermally shock stable bonded solid materials, which comprises mixing a solid mineral or inorganic material in an aqueous medium with a lignosulfonate, treating the aqueous medium with a polyvalent or polydentate cationic complexing agent for lignosulfonate, with application of heat sufficient to maintain said lignosulfonate in fluid form, so as to produce an intimate mix of said complexing agent with said lignosulfonate and said mineral or inorganic material, and thoroughly mixing the resulting substantially dry material with a substantially dry further reagent comprising urea or a urea derivative, so as to cause the mix to agglomerate.

DESCRIPTION OF THE PREFERRED EMBODIMENTS

The resulting agglomerates can be shaped into, for example, briquettes (formed between shaped dies or the like) or pellets, or similar bodies formed by extrusion, pan agglomeration or the like.

The lignosulfonate may be used in method according to the invention in the form of a solution (such as an aqueous solution). Alternatively, when the mineral or organic material is itself aqueous, the lignosulfonate may be used in powder form. The lignosulfonate may include any suitable cation(s); examples of suitable cations are ammonium, calcium, magnesium, sodium or potassium. Of these, calcium is most preferred.

The cationic complexing agent may comprise a transition metal or an alkaline earth metal; the metal is preferably of the fourth period of the Periodic Table of the elements, such as calcium, iron or the like. Of these, calcium is preferred, preferably in the form of the oxide (preferably as lime, which has the advantage of reacting with any free water in the mix).

When lime is used, it is preferably added to the aqueous medium in such an amount as to produce a saturated slaked mix, having a pH typically in excess of 10.

The further reagent is preferably added in powdered form and mixed with the saturated slaked mix by contra-rotating blade mixing or by tumbling, until the mix becomes plastic; this mixing may be carried out at a temperature ranging from ambient to up to about 80° C. The further reagent is preferably urea or a urea derivative (such as an alkyl urea).

When the mineral or inorganic material treated by the method according to the invention is basic oxygen steelmaking sludge, then the resulting shaped agglomerates can undergo direct reduction to a ferrous metal source, for addition to molten steel or iron in a steelmaking process. The direct reduction with carbon as reducing agent, which is typically carried out at about 900–1000° C., is advantageously without disintegration of the agglomerates because of their highly advantageous thermal shock resistance. Any zinc, furthermore, may be volatilised off from the shaped agglomerates during the direct reduction phase.

It is a particular advantage of the present invention, when applied to the process of forming agglomerates from basic oxygen steelmaking sludge or other inorganic or mineral materials, that highly thermal shock-resistant agglomerates can be formed. Such agglomerates are substantially dry and can be added to high temperature direct reduction processes or the like without any deleterious water evolution (which could otherwise have potentially devastating, explosive consequences). It is believed that this thermal shock resistance is beneficially associated with the formation of sulfonyl and sulfur bridges between the polymeric (lignin-based) backbones. Calcium sulfate formed in the slaking step is also believed to beneficially contribute to such thermal shock resistance. The sulfur present in the resulting agglomerates is stoichiometrically bonded in such a form that disadvantageous evolution of oxides of sulfur, or other noxious sulfur compounds, is substantially precluded.

The present invention will now be further illustrated, by way of example only, in the following Examples.

EXAMPLE 1

100 grams of basic oxygen steelmaking sludge, which contained 30% by weight of water, was partially dried, to a solids content of about 12% by weight. 10 grams of calcium lignosulfonate was added as a dry powder, with stirring. Lime (calcium oxide) was then added incrementally, so as to be slaked by the water present in the mix, resulting in a dry powder (the amount of lime being about 5 grams).

3 grams of powdered urea were then added and the mix was tumbled together at a temperature of about 60° C., so as to produce an agglomerated mass. The resulting mass (which had a pH in excess of 10) was formed into briquettes between shaped dies.

The resulting briquettes were highly stable to thermal shock, and could be added in the form of briquettes to a direct reduction process, as referred to above without disintegration.

EXAMPLE 2

200 grams of ferrous sulfide was supplied to a Bekin double-blade contra-rotating mixer; 20 grams of an aqueous solution of calcium lignosulfonate containing 50% by weight of water, was added to obtain a fairly wet mix.

10 grams of lime (calcium oxide) was then added incrementally, so as to be slaked by the water present in the mix, and the plastic mix was thereby converted to a free-flowing powder.

5 grams of powdered urea were then added and the mix was blended, so as to result in a volume increase in the mixer, and an increase in the power input to the mixer (from 65 to 95 watts), the resulting mix being plastic. The resulting mass (which had a pH of about 12) was formed into briquettes in a single floating ring die.

The resulting briquettes were highly stable to thermal shock, and could be added directly to molten ferrous sulfide, without disintegration. (In a test, thirty of the briquettes were thrown into molten ferrous sulfide; none broke and the briquettes floated and gradually melted in the ferrous sulfide.

I claim:

1. A method of forming thermally shock stable bonded solid materials, which comprises mixing a solid mineral or inorganic material in an aqueous medium with a lignosulfonate, then, after the mixing step, treating the aqueous medium with a polyvalent or polydentate cationic complexing agent for lignosulfonate, with application of heat sufficient to maintain said lignosulfonate in fluid form, so as to produce an intimate mix of said complexing agent with said lignosulfonate and said mineral or inorganic material, and then, after the treating step, thoroughly mixing the result substantially dry material with a substantially dry further reagent comprising urea or a urea derivative, so as to cause the mix to agglomerate.

2. A method according to claim 1, wherein the lignosulfonate is in the form of an aqueous solution.

3. A method according to claim 1, wherein the complexing reagent lignosulfonate is in the form of a calcium salt.

4. A method according to claim 1, wherein the complexing agent comprises a transition metal or an alkaline earth metal.

5. A method according to claim 3, wherein the metal is of the fourth period of the Periodic Table of the elements.

6. A method according to claim 1, wherein the complexing agent comprises a calcium compound.

7. A method according to claim 6, wherein the calcium compound is the oxide.

8. A method according to claim 1, wherein the further reagent comprises urea.

9. A method according to claim 8, wherein the urea is added in powdered form and mixed with the saturated slaked mix by tumbling or by means of contra-rotating blades, until the mix becomes plastic.

10. A method according to claim 9, wherein the mixing is carried out at a temperature in the range from ambient to about 80° C.

11. A method according to claim 1, which further comprises shaping the agglomerates into briquettes, pellets or extruded bodies.

12. A method according to claim 1, wherein the mineral or inorganic material comprises basic oxygen steelmaking sludge.

13. A method according to claim 12, wherein the shaped agglomerates are added to molten steel or iron in a steelmaking process.

14. A method according to claim 1, wherein the mineral or inorganic material comprises ferrous sulfide.

* * * * *